*US008068781B2*

US 8,068,781 B2

(12) United States Patent
Ilan et al.

(10) Patent No.: US 8,068,781 B2
(45) Date of Patent: Nov. 29, 2011

(54) SYSTEMS AND METHODS FOR DISTRIBUTING INFORMATION THROUGH BROADCAST MEDIA

(75) Inventors: Gabriel Ilan, Tel-Aviv (IL); Meir Morag, Savyon (IL)

(73) Assignee: Optinetix (Israel) Ltd., Tel Aviv (IL)

( * ) Notice: Subject to any disclaimer, the term of this patent is extended or adjusted under 35 U.S.C. 154(b) by 817 days.

(21) Appl. No.: 12/068,193

(22) Filed: Feb. 4, 2008

(65) Prior Publication Data

US 2008/0132163 A1  Jun. 5, 2008

Related U.S. Application Data

(63) Continuation of application No. 10/296,439, filed as application No. PCT/IL01/00454 on May 21, 2001, now Pat. No. 7,349,668.

(60) Provisional application No. 60/208,225, filed on May 31, 2000.

(51) Int. Cl.
  *H04H 20/71* (2008.01)
  *H04H 40/00* (2008.01)
  *H04B 1/06* (2006.01)
  *H04B 17/00* (2006.01)

(52) U.S. Cl. ...... 455/3.01; 455/3.06; 455/344; 455/66.1

(58) Field of Classification Search .................. 455/566, 455/414.1, 550.1, 567, 3.01, 3.06, 66.1, 344
  See application file for complete search history.

(56) References Cited

U.S. PATENT DOCUMENTS

| 5,371,348 A | 12/1994 | Kumar et al. |
| 5,488,423 A * | 1/1996 | Walkingshaw et al. ......... 725/24 |
| 5,523,794 A | 6/1996 | Mankovitz et al. |
| 5,577,266 A | 11/1996 | Takahisa et al. |
| 5,579,537 A * | 11/1996 | Takahisa ...................... 455/3.06 |
| 5,761,648 A | 6/1998 | Golden et al. |
| 5,812,937 A | 9/1998 | Takahisa et al. |
| 5,821,523 A * | 10/1998 | Bunte et al. .............. 235/472.01 |

(Continued)

FOREIGN PATENT DOCUMENTS

EP 0713335 5/1996

(Continued)

OTHER PUBLICATIONS

Official Action Dated Dec. 1, 2006 From the US Patent and Trademark Office Re.: U.S. Appl. No. 10/296,439.

(Continued)

*Primary Examiner* — Tilahun B Gesesse

(57) ABSTRACT

There are disclosed systems, methods and processes for the distribution of information, typically digital information that is distributed actively, through broadcast media such as television and radio, displays, such as signage, etc., or passively, through displays such as signage or the like. The information can be captured from broadcasted transmissions, scanned from a display, or obtained by being transmitted to the user, who responded to a broadcast with a transmission to a receiving point during a period synchronized with the broadcast, requesting the information sent to his transmitted address. The captured or obtained information may include coupons or the like, that may be redeemed after being successfully captured or obtained. Redemption may be either on-line, where a transmission of coupon information is transmitted to a call center, that places a product order with a supplier and handles payment details, or off-line, where the user takes to coupon to the retailer, for redemption at the point of sale.

11 Claims, 11 Drawing Sheets

U.S. PATENT DOCUMENTS

| | | | |
|---|---|---|---|
| 5,978,013 A * | 11/1999 | Jones et al. | 725/23 |
| 6,057,872 A | 5/2000 | Candelore | |
| 6,058,304 A | 5/2000 | Callaghan et al. | |
| 6,125,172 A | 9/2000 | August et al. | |
| 6,405,049 B2 * | 6/2002 | Herrod et al. | 455/517 |
| 6,680,935 B1 | 1/2004 | Kung et al. | |
| 6,681,393 B1 | 1/2004 | Bauminger et al. | |
| 6,739,514 B2 | 5/2004 | Sanders et al. | |
| 6,771,981 B1 | 8/2004 | Zalewski et al. | |
| 6,806,976 B1 * | 10/2004 | Suyehira | 358/1.14 |
| 6,816,724 B1 | 11/2004 | Asikainen | |
| 7,209,733 B2 | 4/2007 | Ortiz et al. | |
| 2003/0171096 A1 | 9/2003 | Ilan et al. | |
| 2004/0185914 A1 * | 9/2004 | Ohmura et al. | 455/566 |

FOREIGN PATENT DOCUMENTS

| | | |
|---|---|---|
| EP | 0840248 | 5/1998 |
| WO | WO 98/28900 | 7/1998 |
| WO | WO 99/56450 | 11/1999 |
| WO | WO 01/93473 | 12/2001 |

OTHER PUBLICATIONS

Official Action Dated May 24, 2007 From the US Patent and Trademark Office Re.: U.S. Appl. No. 10/296,439.

* cited by examiner

SYSTEMS AND METHODS FOR DISTRIBUTING INFORMATION THROUGH BROADCAST MEDIA

CROSS-REFERENCES TO RELATED PATENT APPLICATIONS

This patent application is a continuation of U.S. patent application Ser. No. 10/296,439 filed on Nov. 25, 2002 which is a National Phase of PCT Patent Application No. PCT/IL01/00454 filed May 21, 2001, which claims priority from and is related to commonly owned U.S. Provisional Patent Application Ser. No. 60/208,225 filed May 31, 2000, entitled: METHODS FOR USING PROMOTIONAL MATERIAL AND INFORMATION IN MOBILE COMMERCE. The contents of the above applications are incorporated herein by reference.

TECHNICAL FIELD

The invention is directed to distribution of information, typically digital information that is distributed through broadcast media such as television and radio, displays such as signage, etc.

BACKGROUND

Coupons are commonplace in the consumer retail market, as consumers benefit from the savings offered, while manufacturers and retailers gain new customers using these coupons. Over eighty percent of the United States population uses coupons. For example, in 1999, manufacturers distributed $187 billion in coupons, and shoppers saved $3.6 billion from coupons.

Most coupons are paper coupons, typically distributed through the print media, such as newspapers, magazines, circulars, etc., direct contact, such as dispensers in stores and flyers, mail, and recently, by computer, as a coupon can be printed from the Internet. The costs associated with paper coupons, such as their creation, printing and the like, are expensive, and their success rate, total distribution compared to actual redemption, is low. In the case of circulars, flyers and mailings, that are typically distributed randomly, most of the coupons therein are thrown away and never used.

Computer distributed coupons lower costs to manufacturers, as they do not need to be printed or mailed. Also, they cut down on wasted paper, as they are only printed at the demand of a user. However, many people do not have access to computers. Even among those people with computers, some people have trouble using the Internet and find printing and other tasks associated with computer usage to be difficult.

Also, there is very little chance of impulse buying, important to retail sales. At best, impulse buying may be achieved with coupon dispensers and flyers, positioned at or near the product, that may yield an impulse sale. However, the purchaser may still deliberate the purchase on the way to the cashier and thus, not conclude the sale. Finally, regardless of the distribution format, paper coupons involve time to extract from the printed page or computer, and are cumbersome.

Many people carry mobile communication devices, such as cellular telephones, personal digital assistants (PDA's), "electronic wallets" and combinations thereof. The numbers of people with mobile communication devices is increasing rapidly. This trend is especially prevalent in Europe, particularly, Sweden and Finland, where greater than 60% of the population carry mobile communication devices. While the U.S. is presently behind this trend, mobile communication device, and in particular, cellular telephone use, is expected to catch up with Europe in the next few years.

Finally, many advertisers resort to broadcast media, particularly television and radio, to promote their products. As most of the public watches television, and it is the most popular medium for advertising, or listens to radio at some time during each day, many viewers or listeners have become upset with commercials. In many cases this has reached points where commercials are avoided and during this time, the broadcast media is switched to other programs, turned off, or the viewer or listener, if possible, goes away until the commercial is over. As a result, the effectiveness of commercials is lessened.

SUMMARY OF THE INVENTION

The present invention improves on the contemporary art by utilizing the advantages of mobile communication devices and the broadcast media, to distribute information, such as digital information, in the form of coupons or the like. The digital information can be distributed actively, by transmissions through broadcast media such as television and radio, displays, such as signage, etc., or passively, through displays, such as signage or the like. This digital information, upon its distribution can be captured and used by users. The information is distributed in a form that can be read from television or radio transmissions, displays (active or passive) by a reader, typically attached to a user's mobile communication device.

The information to be distributed by broadcasting, is coupled to the broadcast signal, typically by being encoded into, or placed or superimposed onto the video or audio signal, to form at least part of the broadcast signal. The broadcast signal is broadcast using existing broadcasting technology.

In the case of a coupon, as the information to be transmitted to and captured from broadcast advertisements, commercials, sound bytes, video clips and portions thereof, the viewer has an incentive to watch or listen to the commercials and be exposed to the advertisers' messages. Specifically, the user can capture the transmitted coupon and utilize it, typically receiving a monetary savings or benefit, that would not normally have been available to him.

With respect to coupon distribution, capture and redemption, the invention accommodates at all kinds of shoppers, from impulse buyers to traditional shoppers, who redeem coupons at the actual point of sale or cashier (typically at a retailer). This is due to the fact that once captured, the coupon is immediately available and will remain available for a finite time period, until used single or multiple times, or combinations thereof. Additionally, the invention allows the users to utilize their coupons and purchase, from multiple locations, ranging from their home, to the retailer, for whom the coupon was distributed.

The invention provides a method for information distribution where comprising placing digital information, for example, information corresponding to a coupon or the like, into a broadcast signal, capturing the digital information from the broadcast signal upon its broadcast, and transforming the captured digital information into a format recognizable to a mobile communication device. The transformed information is also stored on this mobile communication device.

In the case of the coupon, now on the mobile communication device, it can be redeemed in two general ways. First, the mobile communication device, can be activated to contact a call center or the like, that will honor the coupon and execute a sale in accordance with the coupon. The coupon can also be redeemed by taking the mobile communication device, having the coupon stored therein, activating the mobile communication device, so that the coupon shows as a visual pattern for redemption by scanning or the like, or can be transmitted from the mobile communication device, for example, as an infra red (IR), radio frequency (RF), cellular transmission, to a receiver, associated with a cash register, at the point of sale.

Also disclosed is a method for information distribution comprising, placing digital information, for example, a coupon, into a visual pattern. This visual information is then scanned from end to end, typically with the assistance of a light pointing device or the like to assist in the scanning, for its capture. The captured digital information is then transformed into a format recognizable to a mobile communication device, and it is stored on the mobile communication device.

Another method disclosed for information distribution comprises broadcasting the information desired to be distributed and captured and providing a time period synchronized with the broadcasting of this information. At least one transmission is received from at least one user, who desires to receive this information. This transmission includes at least one address of the at least one user, where he desires to receive this information, and this transmission is made within this time period. The user who has made the transmission in this time period is then provided with the desired information at the desired address, as provided in the transmission. When the information is for example, a coupon, it is redeemed as detailed above.

There is also disclosed a method for coupon redemption and purchasing in accordance with the redeemed coupon comprising, receiving coupled first and second information from a user, the first information corresponding to at least one coupon and the second information corresponding to the identification of the user. The first and second information is then stored in at least one storage media. Third information is then stored in at least one data base for each user, this third information for each user includes identification data for the user and purchasing data for the user. There is then an attempt to match the second information with the identification data for the user from the third information, and if there is a match, a purchase order and a payment is sent to a supplier of the good or service corresponding to the coupon. At least one financial instrument, such as a credit card, of the user is charged for the good or service in accordance with the coupon.

There is also disclosed a reading apparatus comprising, a sensor for receiving a first transmission of first information and receiver processing circuitry in communication with the sensor. The receiver processing circuitry is configured for receiving the first transmission and transforming the first information of the first transmission into a format compatible with that of a mobile communication device. There is also a first activatable controller in communication with the sensor and the receiver processing circuitry configured for activating the sensor and the processing circuitry to capture the first transmission.

Additionally, the present invention provides a reading apparatus comprising, a sensor for receiving a first transmission of first information and receiver processing circuitry in communication with the sensor. The receiver processing circuitry is configured for receiving the first transmission and transforming the first information of the first transmission into a format compatible with that of a printing device. There is also a first activatable controller in communication with the sensor and the receiver processing circuitry configured for activating the sensor and the processing circuitry to capture the first transmission. Additionally, there is a second activatable controller in communication with the receiver processing circuitry, that includes processing circuitry configured for manual activation and for sending at least one signal to the printing device for activation of said printing device. Accordingly, the captured information can be printed immediately.

Also disclosed is a method for information distribution comprising, providing digital information, typically a coupon or other information in text or machine readable form. This digital information is captured with a video camera, and transformed into a format recognizable to a mobile communication device. The transformed information is stored on a mobile communication device.

There is yet disclosed a method for information distribution comprising, providing digital information, typically a coupon or other information, in the form of light pulses. These light pulses are captured, whereby the digital information therein is captured, by scanning with a light pulse reader. The captured digital information is transformed into a format recognizable to a mobile communication device, and this transformed information is stored on a mobile communication device.

BRIEF DESCRIPTION OF THE DRAWINGS

Attention is now directed to the attached drawings, wherein like reference numerals or characters indicate corresponding or like components. In the drawings.

DETAILED DESCRIPTION OF THE DRAWINGS

Figure 1B:
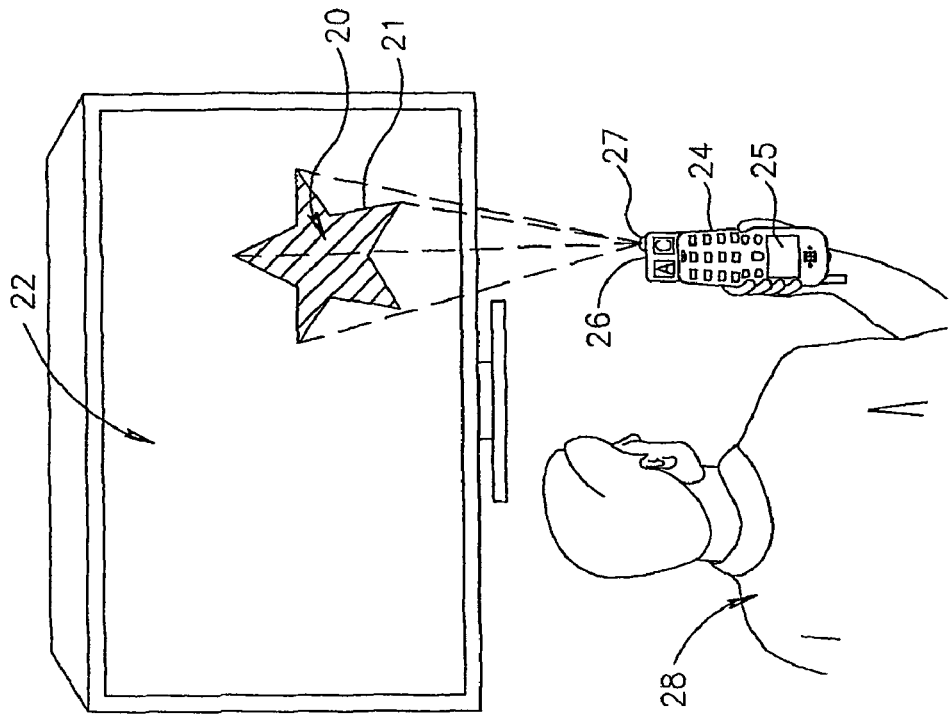
FIGS. 1A and 1B are diagrams of coupon transmissions in accordance with a first embodiment of the present invention.
Figure 1A:
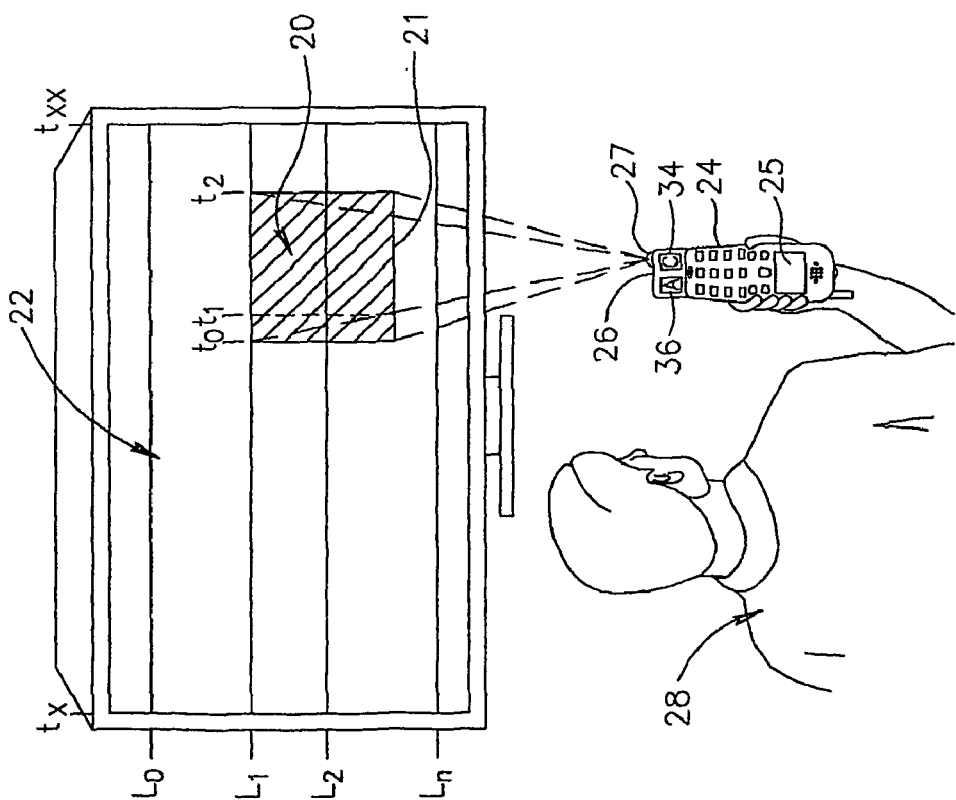

FIG. 1A shows a first embodiment of the present invention, where information is transmitted over a display screen to a receiving device of a user, where the information is captured, stored and utilized. The information is typically digital information, for example, a coupon 20 or other information. The coupon 20 or other information appears in a portion 21 of a television picture 22 (also referred to herein as television), being transmitted to a mobile communication device 24 (typically having a visual display area 25 or screen), via a reader 26 (typically connected mechanically and electronically to the mobile communication device 24), with a sensor 27 thereon, of a viewer (user) 28.

The coupon 20, or other information, is typically coupled with (for example, placed into) the requisite broadcast signal(s), such as video signals, and for example, those for commercials, advertisements, etc. Here, coupon portion 21, and coupon 20 contained therein, is visible in the television picture 22, but it may also be invisible to the human eye.

While a coupon is shown as an example of digital information (this is also applicable with respect to all other embodiments detailed herein) that can be transmitted in accordance with the invention, this is not limiting. Other information, such as digital information (also applicable throughout the entire document), includes for example, Uniform Resource Locators (URLs), electronic vouchers, electronic discounts, promotional materials, prices, discounts, telephone numbers, names, addresses, operating hours, campaign terms and other attributed information, news, tickets (airline, movie, concert and other events, etc.), etc. This aforementioned information (digital information) can also be coupled with (for example, placed into or onto) the requisite broadcast signal(s), transmitted, captured and utilized in accordance with the present invention (and all other embodiments detailed herein) as detailed below.

Additionally, while the information is transmitted (broadcast) in television signal(s) resulting in a picture on a television screen, transmissions (broadcasts) can be over any kind of media and video display, such a closed circuit, Internet, etc., over, display screens, monitors or the like, such as LCD and plasma monitors, including large screen displays for indoor and outdoor use, that typically are associated with billboards and signage. Optionally, the aforementioned information can be targeted to particular wireless network cells;

FIG. 1B is similar to FIG. 1A, and shows the coupon portion 21, with the coupon 20 therein, being a star shape. Any shape, and/or position in the picture 22 is permissible for the coupon portion 21 and coupon 20, provided it can be properly encoded into or onto the video signal as detailed above, and the coupon or other information contained therein can be properly transmitted and captured (as detailed below).

The digital information, here, the coupon 20, may be placed into the broadcast signal, here a video signal or signals, typically in frames of the television picture, or other monitor or display screen. Here, the coupon 20 has been placed into video signal frames of a television commercial, advertisement, sound byte, segments or portion thereof or the like, in accordance with the diagram of FIG. 2.

Figure 2:
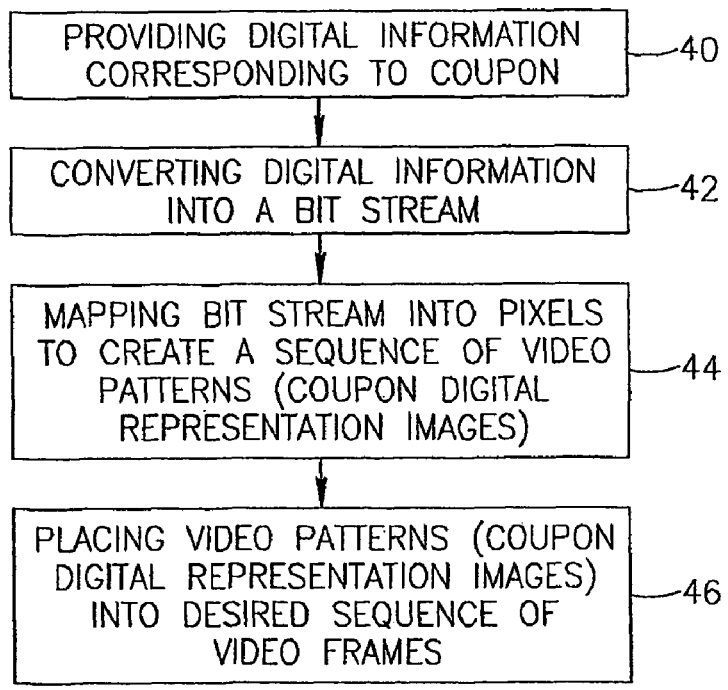
FIG. 2 is a flow diagram detailing the coupon creation and its placement onto video signals in accordance with the present invention.

FIG. 2 is a flow diagram detailing an exemplary process for placing the coupon 20, or other information (listed above) into a broadcast, here a video signal(s). The video signal(s) are typically broadcast in the form of a commercial, advertisement, sound byte, segments or portions thereof, or the like.

Initially, the desired coupon is translated to digital information, typically binary code, at block 40. This coupon information is then encoded into a video pattern, such that the coupon is typically in the form of an encrypted visual pattern for transmission via a television picture 22, to viewers (users) 28.

The encoding process is as follows. The digital coupon information, in binary code, is then converted into a bit stream, at block 42. The bit stream is then mapped into pixels to create a video pattern, here for example, a coupon digital representation image, at block 44. This map is typically a visual pattern of light and dark, black and white, or colored spots at predetermined locations. Alternately, the map could also be invisible to the normal human eye.

The pattern (i.e., coupon digital representation image) is then placed into the desired video signal(s), at block 46. This is typically done by a video processing card, such as a FLASHPOINT 3D Screen Card, commercially available from Integral Technology, Inc., 9855 Crosspoint Blvd., Suite 126, Indianapolis, Ind. 46256-3336, or other similar video processing card designed to superimpose one video stream over another video stream. With this step complete, for example, the commercial is now complete, for broadcast by a television, Internet, closed circuit or other transmission.

The placement of the coupon pattern into the video signal(s) can be accompanied by audio or visual indicators, or combinations of both. Audio indicators, for example, can be music or beeps, etc. Additionally visual indicators, for example, can be flashes, crawlers, icons, etc., that can also be placed into the video signal(s) by conventional technology.

Figure 3A:
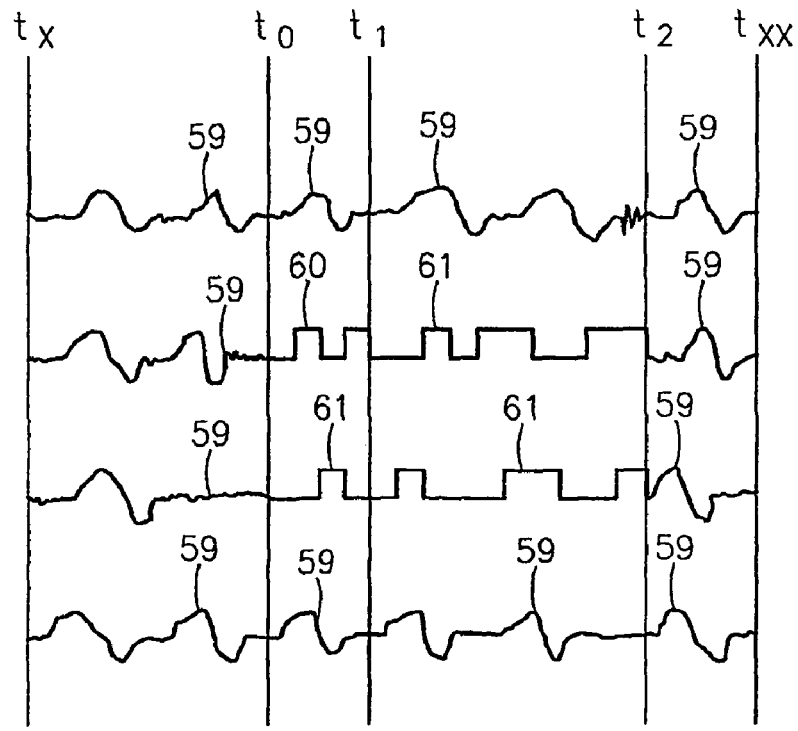
FIGS. 3A and 3B are diagrams for the signals associated with the coupon transmission of FIG. 1A.

Turning to FIG. 3A, an image of the coupon area 21 with the coupon 20 that has been inserted electronically into the video stream containing the commercial, from FIG. 1A, can be viewed schematically. Referring also to FIG. 1A, the Line $L_0$, corresponds to a line in the picture, that contains information as to this picture, here, the actual signal 59 for the television picture 22, but lacks the digital information of the coupon 20 or other desired information to be transmitted. In line $L_1$, the first line of the coupon 20, and thus includes digital information corresponding to the coupon, there is initially a preamble signal 60 of a synchronizing sequence of bits, recognizable to the reader 26, as this preamble signal 60 has been preprogrammed into the reader 26. This preamble signal 60, beginning at $t_0$ ($t_0$ representative of the beginning of the coupon portion 21), indicates a change in the signal, from the signal 59 of the television picture, to the preamble 60 of the coupon portion 21 to the digital signal 61 of the coupon 20. At $t_1$, the actual signal 61 of the coupon (coupon information) begins, until the end of the coupon portion 21 at $t_2$. The signal then reverts to the signal 59 of the original picture, from $t_2$ until $t_{xx}$ ($t_{xx}$ representative of the end of the original picture).

Similarly, at line $L_2$, when $t_0$ is approached, the actual digital signal 61 for the coupon portion 21 resumes, until time $t_2$. At line $L_2$, there is typically not a preamble signal, and the coupon begins immediately at time $t_0$, as the beginning of the coupon is known, having been calculated by a processing circuit (knowing $t_2$-$t_{xx}$ and $t_x$-$t_0$) in the reader 26. Finally, at line $L_n$, the signal 59 is outside of the coupon portion 21, and thus, the signal is the same as that at $L_0$, with the original picture. The information bit stream may modulate the intensity (amplitude) or the color (frequency) of the light emitted from the transmitting area, portion or banner.

Figure 3B:
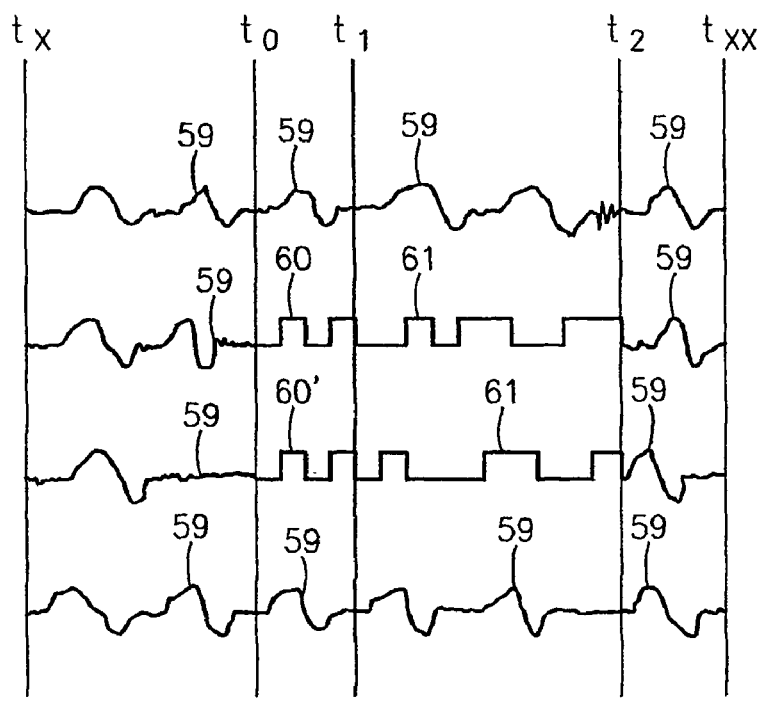

Alternately, as shown in FIG. 3B, each line of the coupon portion 20, here $L_1$ and $L_2$, could have preamble portions 60, 60', that are the same or different, but all recognizable to the reader 26, as they are preprogrammed into the circuitry of the reader 26. This arrangement of preambles 60 may utilized in environments with high optical disturbances, such as reflections, fluorescence, and other disturbances. While there is a loss of bits of coupon information, as a result of the additional preambles (represented here by preamble 60'), this avoids loss of synchronization in cases of disturbances.

The coupon is received by a reader 26 attached to the mobile communication device 24 of a user 28. The reader 26 is such that it can removed from and temporarily engaged in the requisite mobile communication device 24. The reader 26 is typically includes a sensor 27, such as photodetectors for visible light, for example, a photodiode. The reader 26 typically includes processing circuitry for performing functions including those associated with synchronizations, decoding the captured transmission, data (information) storage and transforming the decoded transmission into a format recognized by and compatible with the hardware and software of the mobile communication device 26, typically for storage therein (and, where applicable, displayable on the screen 25 of the mobile communication device 24).

The reader 26 is configured to fit mobile communication devices, such as cellular telephones, Personal digital assistants (PDAs), etc., by conventional mechanical and electronic connections and adapters. However, the reader 26 and mobile communication device 24 could also be integral, as a single device. The reader 26 also includes two controls represented by buttons 34, 36 labeled "C" for "Capture and Storage" and "A" for "Activate." Button "C" 34 is pressed when the user 28 desires to capture this coupon from the television commercial or other on-screen display and store the coupon with its associated information and coding in his mobile communication device 24. Button "A" 36 is pressed when the user 28 decides to purchase and/or redeem the transmitted and received coupon.

The reader 26 also includes a sound or visual indicator (and circuitry associated therewith), or circuitry for providing a tactile indication (for example, vibrating) that acknowledges the successful capture and storage of the coupon or other information. Alternately, the reader 26 could be programmed to indicate successful coupon or information capture to the mobile communication device 24, that can also include hardware, software, or combinations thereof, for generating the sound or visual indication.

Figure 4:
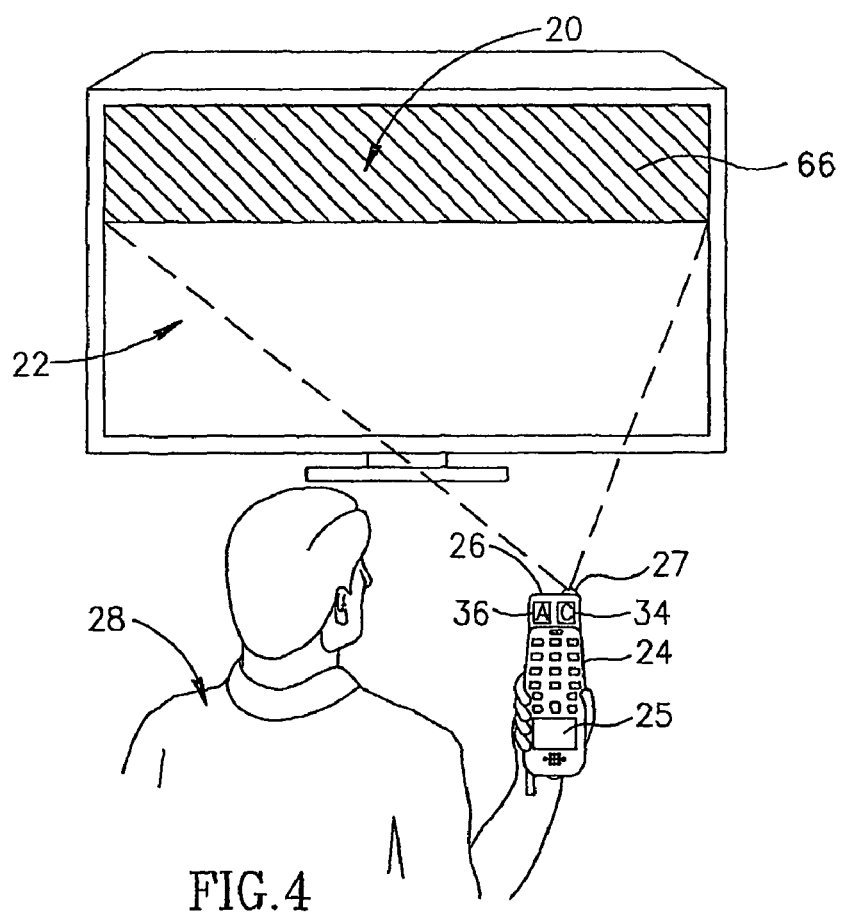
FIG. 4 is a diagram for coupon transmission in accordance with a second embodiment of the present invention.

Other alternate coupon or other information transmissions, typically of digital information, include visible transmissions, as shown in FIG. 4. Here, the visible transmission is in the form of a banner 66, where coupon 20, produced as shown in FIG. 2 and detailed above, has been reshaped and encoded into the video signal in this shape, so as to appear at the top of the television picture 22. This banner 66, while shown at the top of the television picture 22 could be anywhere in the television picture 22.

Another alternate coupon transmission is within the picture 22 itself, and invisible to the human eye. Here, low level light signals are encoded into the picture, video clip or the like, by amplitude modulation. The coupon is placed into dark areas of the television picture invisible to the human eye. The coupon is produced and placed into the video signal in accordance with FIGS. 5A and 5B.

Figure 5A:
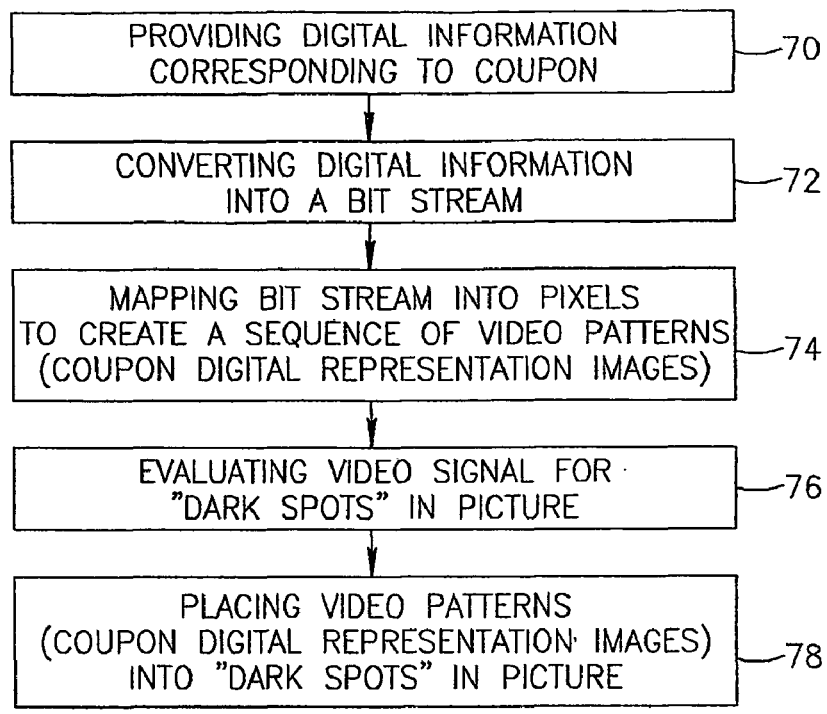
FIG. 5A is a flow diagram detailing coupon creation and its placement onto video signals in accordance with a third embodiment of the present invention.

Turning to FIG. 5A, process steps at blocks 70, 72 and 74, correspond identically to the respective steps in blocks 40, 42 and 44 in FIG. 2, as detailed above. With the video patterns created, the video signal is evaluated for "dark spots", areas in the picture transmitted that are normally invisible to the human eye, yet still readable to a photodetector, at block 76. The pattern (i.e., coupon digital representation image) is then placed into the desired video signal(s), at block 78.

Figure 5B:
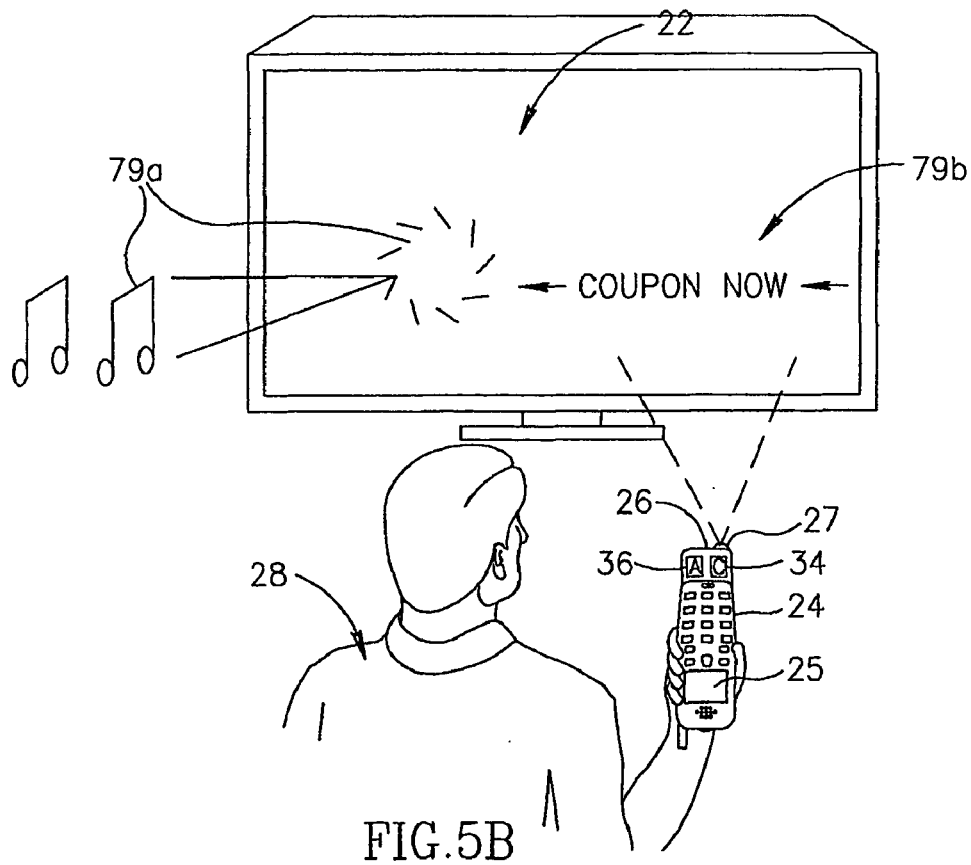
FIG. 5B is a diagram for coupon transmission in accordance with the third embodiment of the present invention.

In FIG. 5B, once the video stream with the coupon 20 appears on the television 22 or other display screen, it is transmitted so as to be available for capture by the reader 26 on the mobile communication device 24 and storage in the mobile communication device 24. There is typically a prompting of the viewer or user 28, that coupon transmission is coming, this prompting typically in the form of audio indications 79a, such as beeps, tones or music, visual indicators 79b, for example icons, crawlers (in the direction of the arrows), or combinations of audio and visual indicators. The user 28 then points their mobile communication device 24 with their reader 26 aimed at the television picture 22, preferably at the coupon portion 21, to capture the transmitted coupon 20.

For example, with the reader 26 and mobile communication device 24 shown in FIG. 1, when the coupon portion 20 is visible, or the user 28 has been prompted in the case of the invisible coupon transmission, the "C" button 34 is pressed, such that the transmitted coupon can be captured by the reader 26 on the mobile communication device 24. Capture typically occurs as the reader 26 processing circuitry is such that it awaits for the beginning of a cycle to capture the transmission in this captured cycle. Capture continues, until the user 28 receives an indication of successful capture, this indication typically being a sound, visual or tactile (e.g., vibrating) indication from the reader 26 or the mobile communication device 24, as detailed above. There can then be another indication, sound, visual or tactile, from either the reader 26 or the mobile communication device 26 that the captured coupon (from the transmission) has been successfully stored in the mobile communication device 24.

When purchase and/or coupon redemption is desired, the "A" button 36 can be pressed, whereby the coupon will be utilized in accordance with the methods detailed below.

Figure 6:
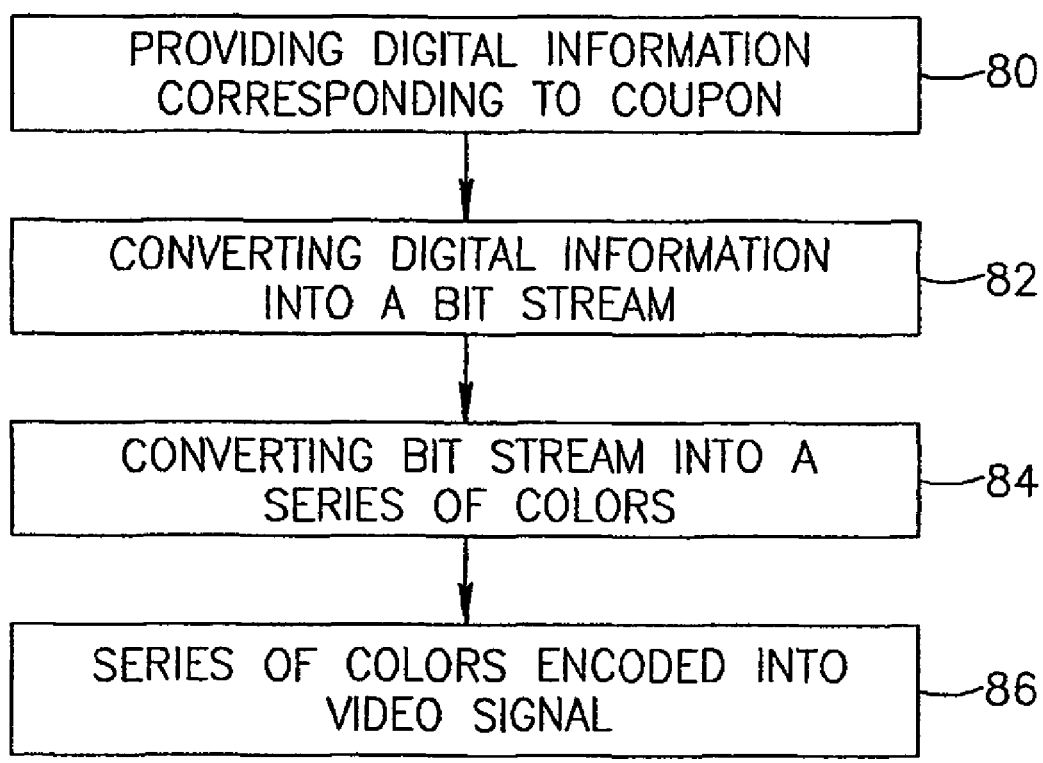
FIG. 6 is a flow diagram detailing coupon creation and its placement onto video signals in accordance with a fourth embodiment of the present invention.

Alternately, the coupon 20 can also be placed into the television picture 22 or other on-screen display by color modulation encoding, as detailed in FIG. 6. In FIG. 6, digital information corresponding to that in the coupon is provided, at block 80. This digital information is then converted into a bit stream at block 82. The digital information is converted into a series of colors, at step 84, with this series of colors encoded into the video signal, at block 86. Here, the colors are of different wavelengths, whereby the light frequency is now being modulated, instead of, or in addition to, the amplitude, as shown and described for FIGS. 2 and 5 above. The resultant transmission is of a series of different colored pixels of different wavelengths (frequencies) in the coupon portion 21 of the television picture 22.

If the coupon, or other video information (detailed below) is transmitted in this manner, the reader for the mobile communication device 24 is similar to the reader 26 above, except that it has been modified to include a photodetector, such as a photodiode or a combination of photodiodes, or other device (and associated processing circuitry), sensitive to wavelengths of different colors, that are in the coupon portion 21 of the television picture 22. Capture of the coupon is in accordance with any of the procedures detailed above.

With the coupon now stored on the mobile communication device 24 of a user 28, it can now be redeemed. The coupon, as stored in the mobile communication device 24, typically includes all information necessary to perform the purchase, as this information was captured from the requisite broadcast, transmission, or scan (all as detailed herein). For example, this information includes the specific brand of the product associated with the coupon, product identification (ID) data or number, price, coupon discount, time and date.

The coupon transmitted may be a traditional coupon, where a portion of the price is discounted upon its redemption. However, other types of coupons are also permissible, such as descending coupons, whose monetary discount or other value decreases as the time period between capture and redemption increases. The coupon can also be programmed to erase itself after a time period, upon redemption, and can be include expiration dates. It can also be programmed to be manually erased by pressing a button (key) on the mobile communication device 24, where it is stored. The coupons can also be for any number of redemptions, including unlimited redemptions, expiring after a time period, even if not all redemptions have been completed, or after all redemptions have been completed.

Redemption is in accordance with the processes detailed below. Redemption is permissible from the time the coupon has been successfully captured and stored until the time the coupon expires, is automatically erased or the like.

Figure 7:
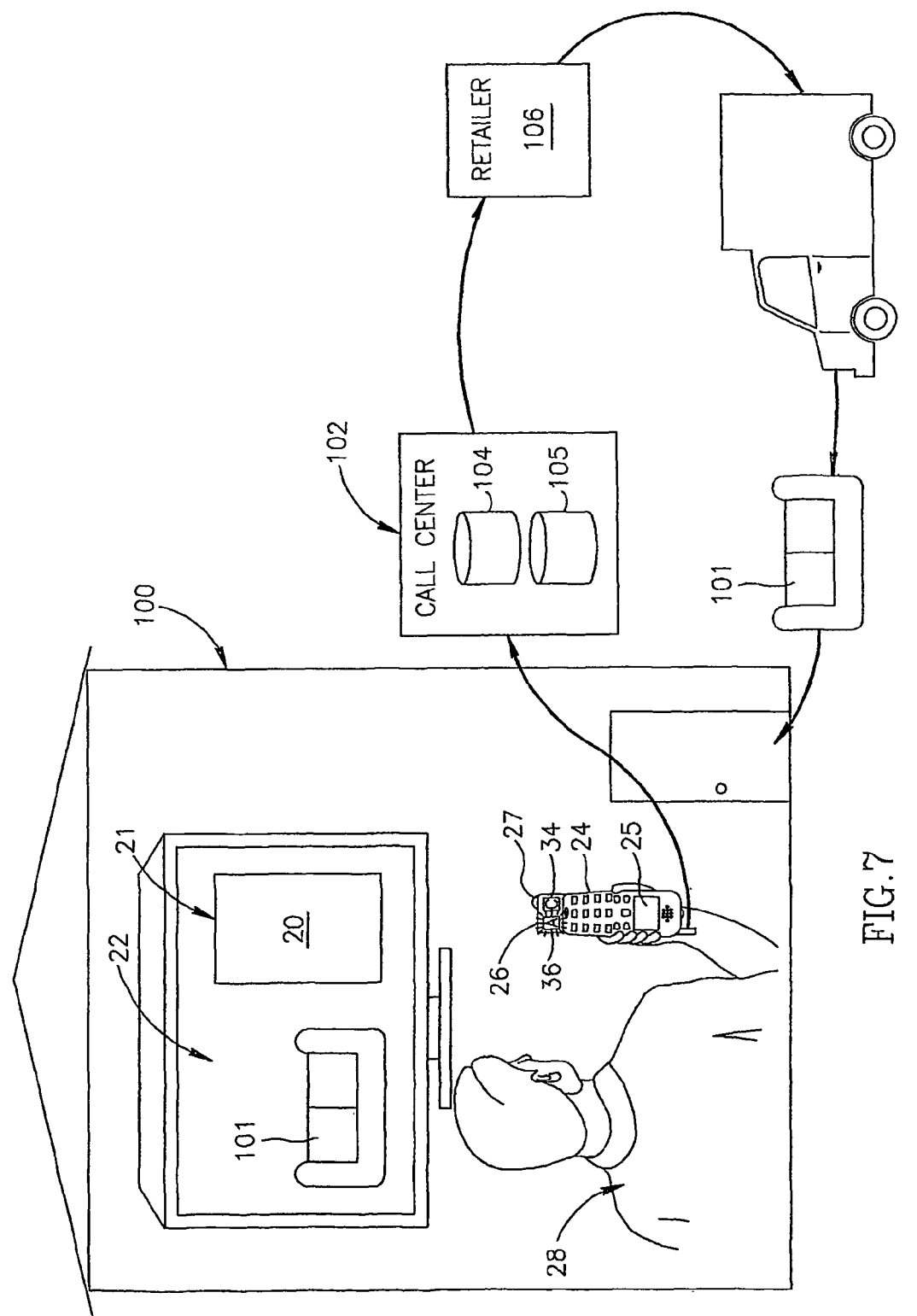
FIG. 7 is a diagram detailing a process of coupon redemption in accordance with the present invention.

FIG. 7 details a process for redemption, that is "on-line" or contemporaneous with the broadcast commercial, advertisement, etc., that included the coupon. This process is exemplary of impulse purchasing. Here, the user 28, sitting at his home 100, for example, has just concluded watching a television advertisement (i.e., a commercial) for a sofa 101, and has downloaded (captured) and received the coupon 20 from the television broadcast. The now stored coupon can be immediately redeemed by the user 28 pressing the "A" or Activate button 36 on his reader 26. Alternately, activate button 36 and associated circuitry, can be optional, as the mobile communication device 24, can be activated directly (by itself, as detailed below.

This activates the mobile communication device 24, here a cellular telephone, that calls a call center 102, and transmits the coupon product code extracted from the coupon to the call center 102 together with information, such as identification information, such as the user's 28 cellular telephone number, Personal Identification Number (PIN) or other identification data. Alternately, the mobile communication device 24, can be activated directly (without pressing the "A" button 36 of the reader 26), typically by pressing buttons keys, touching displays with a stylus, or the like, for telephone numbers, access codes (for example, *xyz), etc. of the call center 102, to make a transmission, typically a telephone call thereto. In the case of a PDA as the mobile communication device 24, the reader 26, employed therewith, has processing circuitry for making the transmission (typically, a telephone call) to the call center 102.

This data is entered into a database 104, at the call center 102. This PIN number brings up information on the user, for example, address and financial instrument information associated with the user, typically his credit card (also debit card, or other similar payment card) number, bank transfer or other payment method. Contemporaneous in time, information about the consumer and the sale enters into a second database 105 at the call center 102. This information may include coupon information, time of coupon redemption, product codes, prices and discounts.

The call center 102 forwards, for example, a purchase and delivery order along with electronic payment or electronic payment details to a retailer 106. The retailer 106 processes this information, whereby, the sofa 101, viewed in the broadcasted advertisement, is delivered to the home 100 of the user 28, with the call center 102 or the retailer 106, respectively (depending on if the call center 102 sent electronic payment to the retailer 106) charging the user's 28 financial instrument, typically, his credit card, accordingly.

Alternately, the user 28 can press a code on his cellular telephone, such as *xyz, whereby the identical call can be made to the call center 102, with the process proceeding as above.

In another alternate, the cellular telephone and Internet enabled PDA of a user could include a stored Internet address of the call center 102. When coupon redemption is desired, the user would access the call center's Internet address. The process would then proceed as above.

Figure 8:
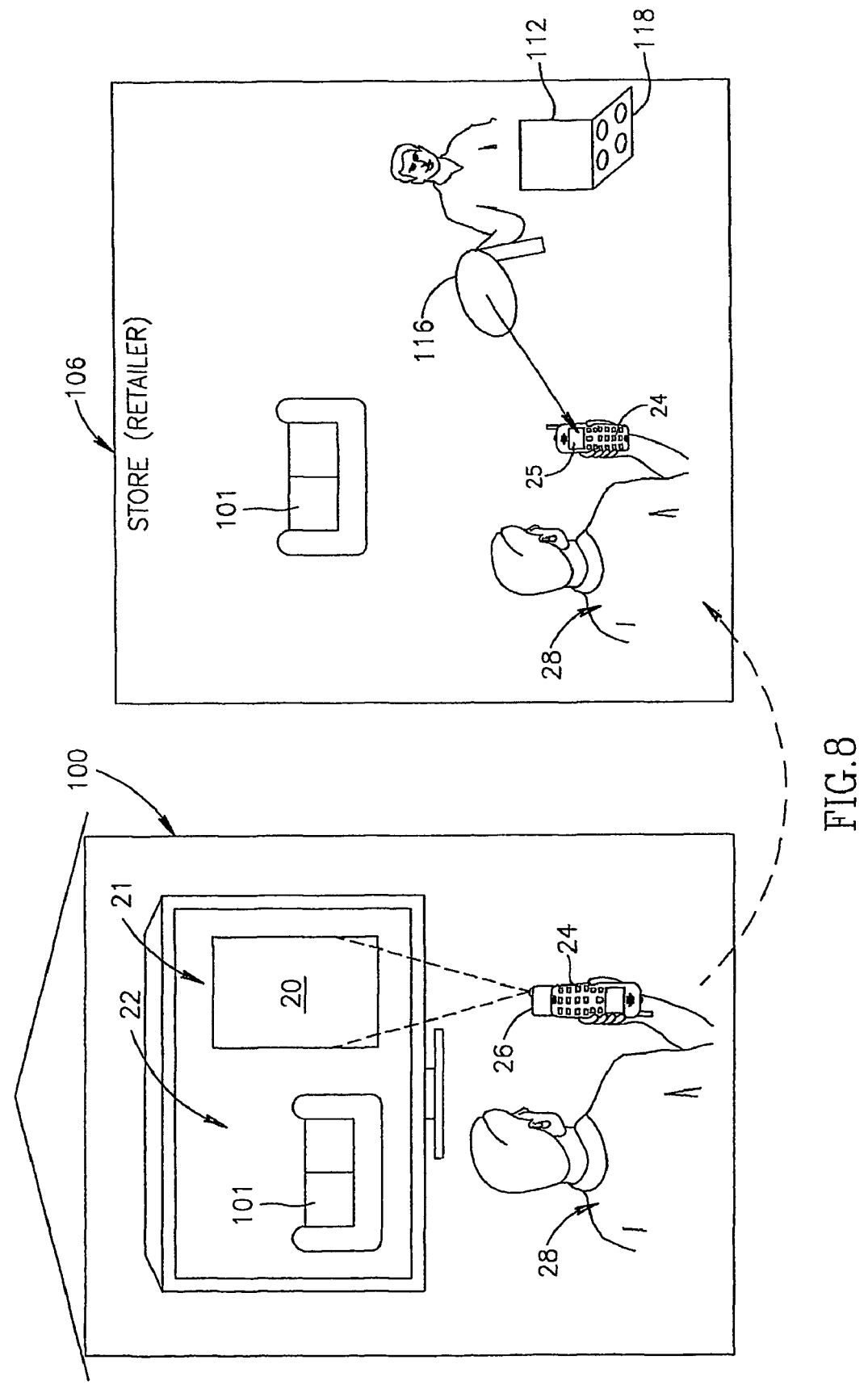
FIG. 8 is a diagram detailing another process of coupon redemption in accordance with the present invention.

Turning now to FIG. 8, there is detailed another method of redemption. This method is referred to as "off-line" redemption, as here, there is a longer time delay than the "on-line" method detailed above, as "off-line" redemption is in the more traditional manner of coupon redemption. Here, the coupon will be redeemed at the point of sale, typically the location of the retailer 106, where the user 28 travels, in order to examine the merchandise, for which the coupon is applicable.

The user 28 then uses his coupon, stored on his mobile communication device 26 at a cashier 112 or the like. The coupon is stored together with a form that it can be displayed and read by a machine. For example, the coupon can be displayed as a visual pattern, such as a bar code, or other machine readable form, and displayed on the display area (i.e., display screen) 25 of the mobile communication device 26. It is redeemed by being scanned by a scanner 116 at the cash register 118 or the like. Alternately, the coupon may be stored with forms (in the mobile communication device 26) for infra-red (IR) or visible light transmissions, Radio frequency transmissions, including Bluetooth® transmissions, cellular transmissions, between the mobile communication device 26 and a reader/receiver configured for the requisite transmission. This reader/receiver is associated with the cash register 118 or the like and is analogous to the scanner 116, that is associated with the cash register 118.

In another redemption at the point of sale, a telephone number could be dialed by the mobile communication device 24, for example, a cellular telephone. This telephone call would go to a data base located on the cellular network. The redemption would be done automatically for valid coupons, and the information could be registered at the point of sale.

In these redemption processes, consumer information is obtained, as it is transmitted ultimately to the retailer, where the coupon is redeemed. This information typically includes for example, consumer data, such as profiles and details about the consumer, capturing data, the time and location at which the coupon was captured, and redemption data, the time and location of redemption and whether the coupon was redeemed on-line or off-line (as detailed above), the amount of discount the coupon was redeemed for, typically important with descending coupons (detailed below) or other variable discount coupons.

Figure 9:
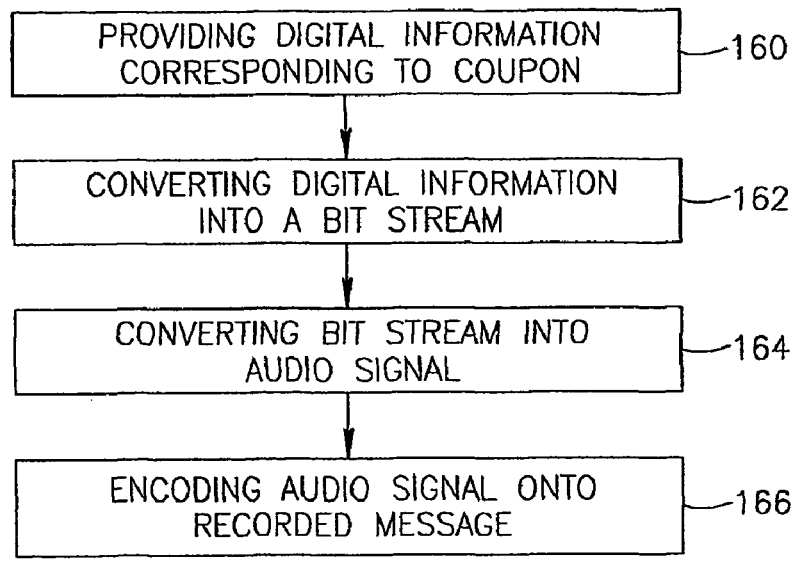
FIG. 9 is a flow diagram detailing coupon creation and its placement onto audio signals in accordance with a fifth embodiment of the present invention.
Figure 10:
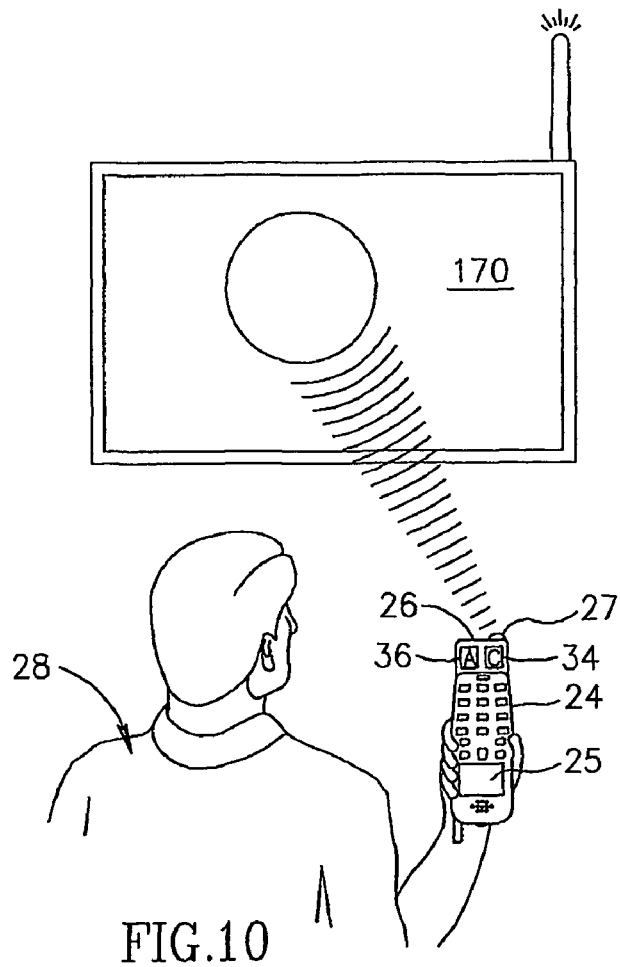
FIG. 10 is a diagram of a coupon transmission in accordance with the fifth embodiment of the present invention.

Turning now to FIGS. 9 and 10, there is shown another embodiment of the invention, as information, typically digital information, such as coupon, or other information (as detailed above), for example, is transmitted to a reader, that here is a sound wave receiver 26', attached to (but could also be integral with, as detailed above) the mobile communication device 24 of a user 28, via a broadcast signal(s). Here, for example, the broadcast signal(s) include sound waves. In FIG. 9, digital information corresponding to the coupon, or other desired information (detailed above) is provided, at block 160. This digital information is converted into a bit stream, at block 162. The bit stream is then converted into an audio signal, at block 164. This conversion is similar to that of a modem, where the digital information is converted to an audio transmission. This audio signal is then encoded onto a recorded message, at block 166, for example, by recording preprogrammed digital modulations on the requisite sound track, typically a commercial, sound byte or the like.

Turning to FIG. 10, the coupon or other information is transmitted in a broadcast signal, and in particular, an audio signal that is typically an audible signal to the normal human ear. Alternately, the signal may be inaudible to the normal human ear. Listeners (users) 28 are typically made aware of this audible signal by a sound or visual (as with televisions, display monitors, etc.) indication or prompt. Once prompted, the user 28, with his mobile communication device 24 and sound wave receiver 26', places the sound wave receiver 26' proximate the sound source 170, and presses button "C" to capture the coupon, or other information. This process typically continues until a second sound, visual prompt, or tactile indication (as detailed above), is heard, seen or felt, from the sound wave receiver 26 or mobile communication device 24 (as detailed above) indicating a complete transmission and capture of the coupon or other information.

Here, the sound wave receiver 26' is similar to the reader 26 detailed above, but the sensor 27 has been modified with a microphone, modem, and associated processing circuitry, in order to capture the audio signal. Here coupon information is provided in digital an audio signal corresponding to coupon or other information, and convert it into data usable by the mobile communication device 24.

With the coupon or other information having been captured and stored in the mobile communication device 24 as detailed above, redemption is in accordance with any of the processes detailed above.

Figure 11A:
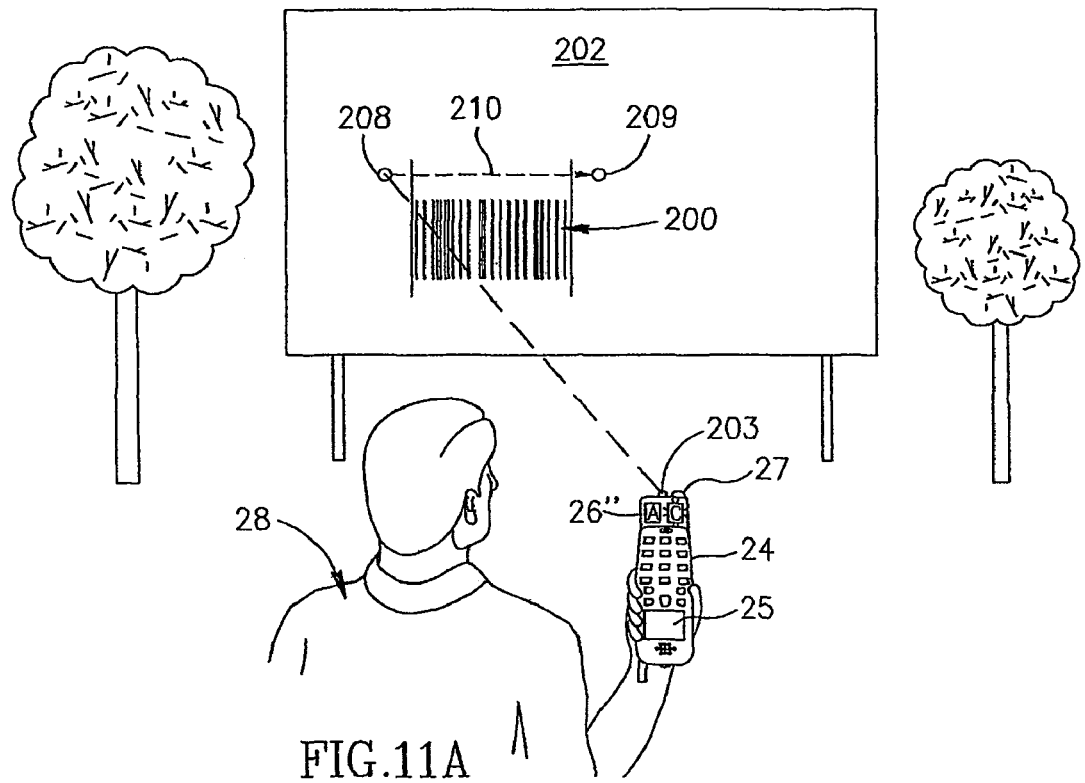
FIG. 11A is a diagram of a coupon transmission in accordance with a sixth embodiment of the present invention.

FIG. 11A shows another embodiment where a coupon 200, or other information, similar to that detailed above, is in a passive form (different from the active forms above, where the information, for example, the coupon, is transmitted to the user), as it is placed on a permanent display, such as a billboard 202, signage, poster or the like. The actual coupon 200 may be a unique pattern, of shapes and/or colors, for example, in the form of a bar code, colors, or combinations thereof.

The user 28, would then aim the reader 26" coupled with the mobile communication device 24, at the billboard 202 in such a manner to scan or sweep (from end to end) across the entire coupon 200 (here for example, represented by a bar code), in a horizontal or vertical manner. The reader 26" is similar to reader 26, except that it has been optionally modified with a laser or other visual light pointing device 203, such that the user 28 can see the coupon 200 being scanned (swept) from end to end, at representative points 208, 209 at each end, for proper capture (shown by broken line arrow 210). The reader 26" is modified with a special lens 211 (in replacement of sensor 27) and photo detector (and associated processing circuitry), necessary to capture patterns as well as bar codes, and other black and white and color patterns, or other machine readable forms.

With the coupon or other information having been captured and stored in the mobile communication device 24 as detailed above, redemption is in accordance with any of the processes detailed above.

Figure 11B:
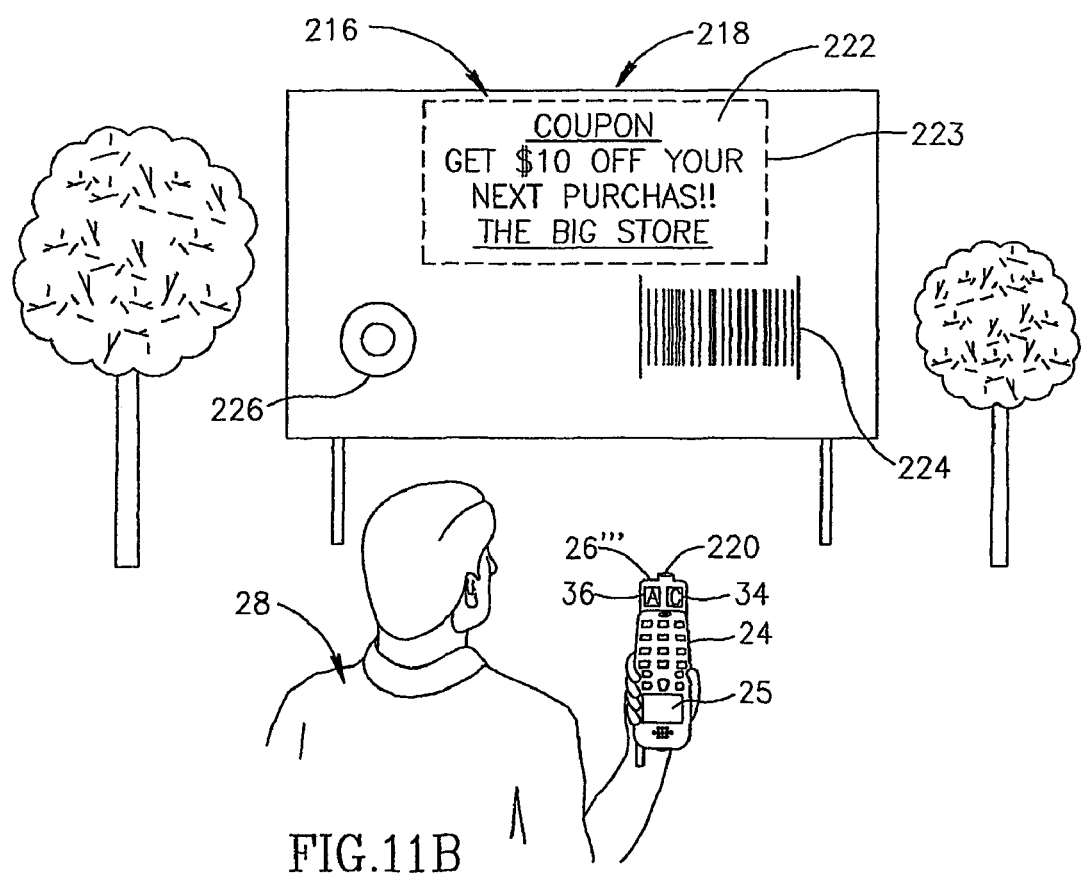
FIG. 11B is a diagram of a coupon transmission in accordance with a seventh embodiment of the present invention.

As shown in FIG. 11B, information, here for example, a coupon 216, may be displayed, on billboards 218, signage, posters, or other displays, so as to be in forms suitable for scanning by a video camera 220 on a reader 26'''. These forms may include passive forms, where the coupon text 222 (represented by a broken line box 223 for description purposes only), a machine readable form 224, or an active form, such as a light pulse transmitter 226. While three forms are shown on a single billboard, this is exemplary only, any single or multiple combination of forms on a single billboard is permissible.

The reader 26''' is coupled to a mobile communication device 24 as detailed above. The reader 26''' is similar to the reader 26 (detailed above) but it has been modified with video camera 220 (either integral with or attachable thereto), such as a hand-held video camera or the like, and associated processing circuitry, typically one or more of any of such processes including image processing, optical character recognition, pattern recognition, visual pattern, bar code or other machine readable form recognition, light pulse recognition, or the like.

In a first capture method, the reader 26''' is aimed at the coupon text 222, in block 223. The text 222 is scanned by the video camera, in a manner similar to that for the reader 26" above. Coupon capture is accordance with the methods disclosed for the reader 26 as above. The information, here the coupon, is extracted from the recorded video by processing circuitry in the reader 26''', that applies image processing, optical character recognition, pattern recognition and other associated processes to, decode and transform this captured information into a form suitable for the mobile communication device 24, as detailed for the reader 26 above.

In a second capture method, the reader 26''' is aimed at the machine readable form 224, and this machine readable form 224 is scanned, in the manner disclosed for the reader 26" above. (Reader 26''' may also be modified with a pointing device and associated processing circuitry in the same manner as the reader 26" detailed above). Coupon capture is per the methods disclosed for the reader 26". The information, here, the coupon is extracted from the recorded video by processing circuitry in the reader 26''', that applies image processing, pattern recognition and other associated processes to, decode and transform this captured information into a form suitable for the mobile communication device 24, as detailed for the reader 26 above.

In a third capture method, the reader 26''' is aimed at the light pulse transmitter 226, that transmits light pulses in repeatable sequences. Coupon capture is per the methods disclosed for the reader 26". The information, here, the coupon, is extracted from the recorded video by the processing circuitry in the reader 26''', that applies light pulse processing and other associated processes to, decode and transform this captured information into a form suitable for the mobile communication device 24, as detailed for the reader 26 above. Alternately, the reader 26 with the photodetector (such as a photodiode), could be modified for light pulses, and employed with a mobile communication device, to capture the information, here, the coupon, and process it such that it is stored in the mobile communication device 24 (as detailed above).

With the information, here, the coupon, having been captured and stored in the mobile communication device 24 as detailed above, redemption is in accordance with any of the processes detailed above.

In another alternate embodiment, a standard video camera can photograph, scan or otherwise record text, machine readable form or light pulses of the billboard 218. The recorded video can then be subject to any of the above detailed processes for recognition, decoding, etc., followed by transformation to a form suitable for the mobile communication device 24 and subsequent transfer to the mobile communication device, all as detailed above. Redemption is then in accordance with any of the processes detailed above.

Figure 12B:
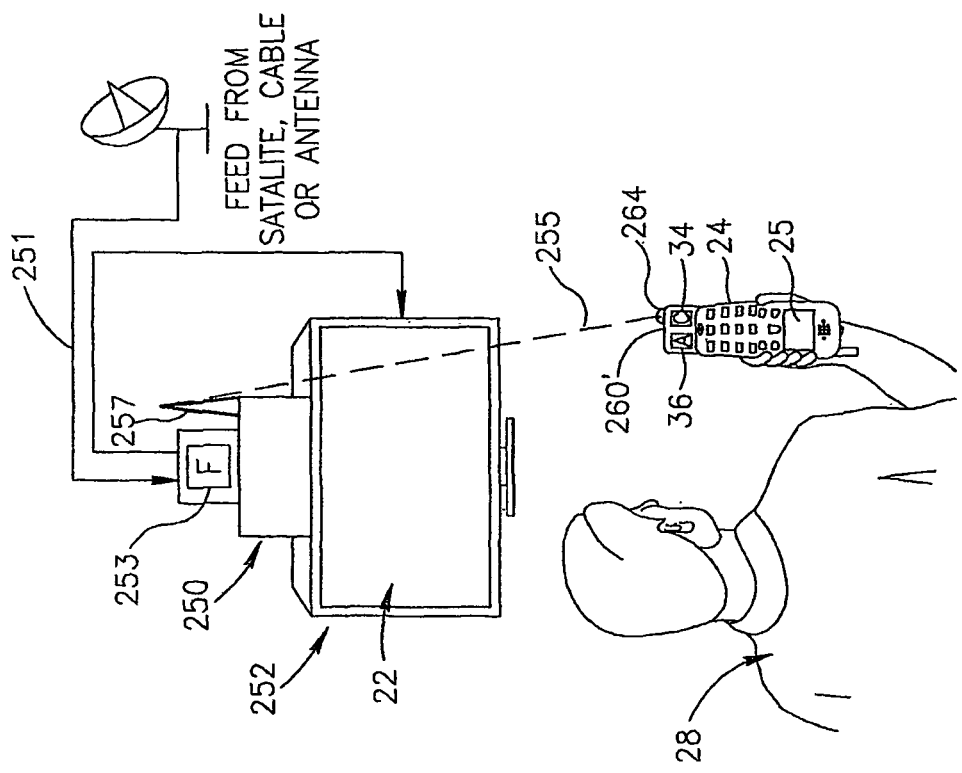
FIGS. 12A and 12B are diagrams of coupon transmissions in accordance with an eighth embodiment of the present invention.
Figure 12A:
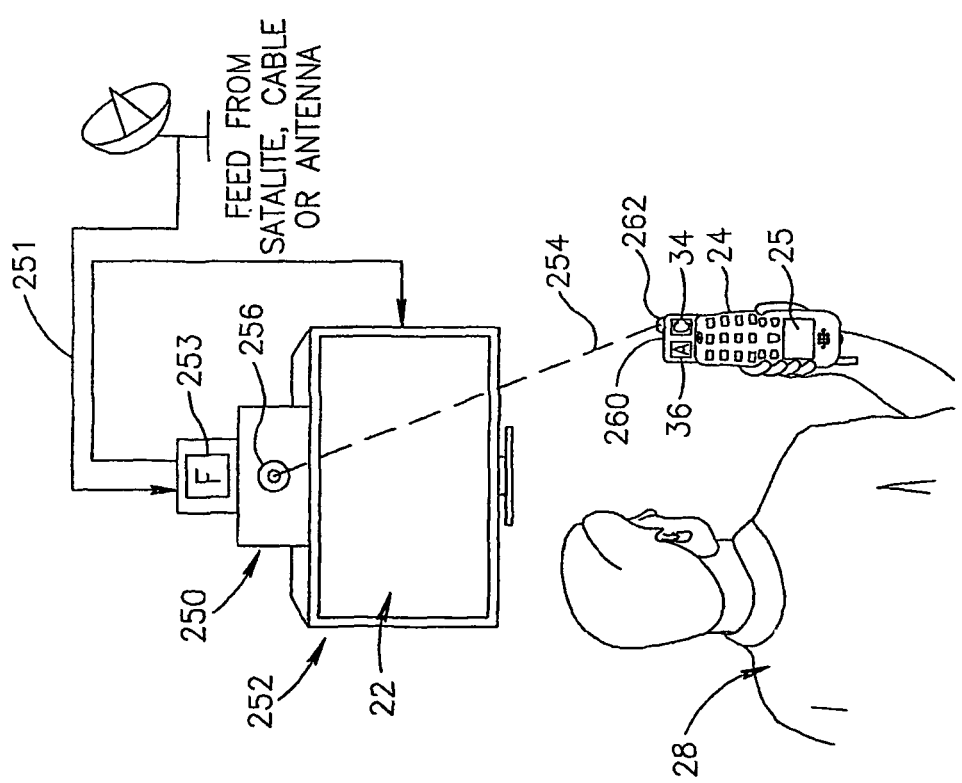

FIGS. 12A and 12B show other embodiments of the present invention. Here, the coupon or other information is a broadcast signal that is formed by superimposing a signal(s) with the digital information, here for example, the coupon or other information, over the video signal(s) for the commercial, advertisement, or the like. This superimposition can be by placing the coupon signal into a specific time slot, such as in the backtrace period, as with Teletext. The coupon signal could also be a frequency multiplexed with the video signal of the commercial.

The television set-up includes a transmitter box 250. This transmitter box 250 sits intermediate the television feed 251 and the television 252, on which the commercial is broadcast and viewed.

The transmitter box 250 includes a filter (F) 253 or the like, that separates the coupon signal from the original video signal for the commercial. The original video signal goes through to the television 252, where it is viewed, and the coupon signal goes to the transmitter box 250.

In FIG. 12A, once in the transmitter box 250, the coupon signal is converted to an infra red (IR) pulse stream (shown by broken line 254). It is transmitted to the user 28, via an IR transmitter 256 on the transmitter box 250. Transmission is typically initiated by prompting with audio and video indicators as detailed above.

The user 28, would then aim and activate (typically by pressing button "C" 36, as detailed above) his reader, here a receiver 260, coupled with the mobile communication device 24, at the transmitter box 250, and in particular at the IR transmitter 256 on the transmitter box 250. The receiver 260 is similar to the reader 26 detailed above, except it includes the respective IR receivers 262 (as the sensor 27) and associated processing circuitry for decoding the coupon and transferring it to the mobile communication device 24.

In FIG. 12B, once in the transmitter box 250, the coupon signal is converted to a Radio Frequency (RF) pulse stream (shown by broken line 255). It is transmitted to the user 28, via either an RF transmitter 257 on the transmitter box 250. Transmission is typically initiated by prompting with audio and video indicators as detailed above.

The user 28, would then activate the reader, here a receiver 260', typically by pressing button "C" 36 as detailed above. The receiver 260', coupled to the mobile communication device 24, now proximate to the transmitter box 250, and in particular at the RF transmitter 257 on the transmitter box 250. The receiver 260' is similar to the reader 26 detailed above, except it includes an RF antenna 264 (as the sensor 27) and associated processing circuitry for decoding the coupon and transferring it to the mobile communication device 24.

Alternately, the RF transmission could be in accordance with Bluetooth®, with the transmitter box 250 and reader 260' modified accordingly.

With the coupons or other information having been captured by the receivers 260, 260' and stored in the respective mobile communication devices 24, coupon redemption is in accordance with any of the processes detailed above.

In all of the above embodiments, the respective readers, detailed above, are attached mechanically, electrically, or combinations of both attachments, to the respective mobile communication device 24. The mobile communication device 24 is typically configured for interfacing with a printer, whereby if desired, the digital information, such as the coupon or other information stored in the mobile communication device 24 can be printed. Redemption of this printed coupon would be in a manner similar to that for paper coupons.

Figure 13:
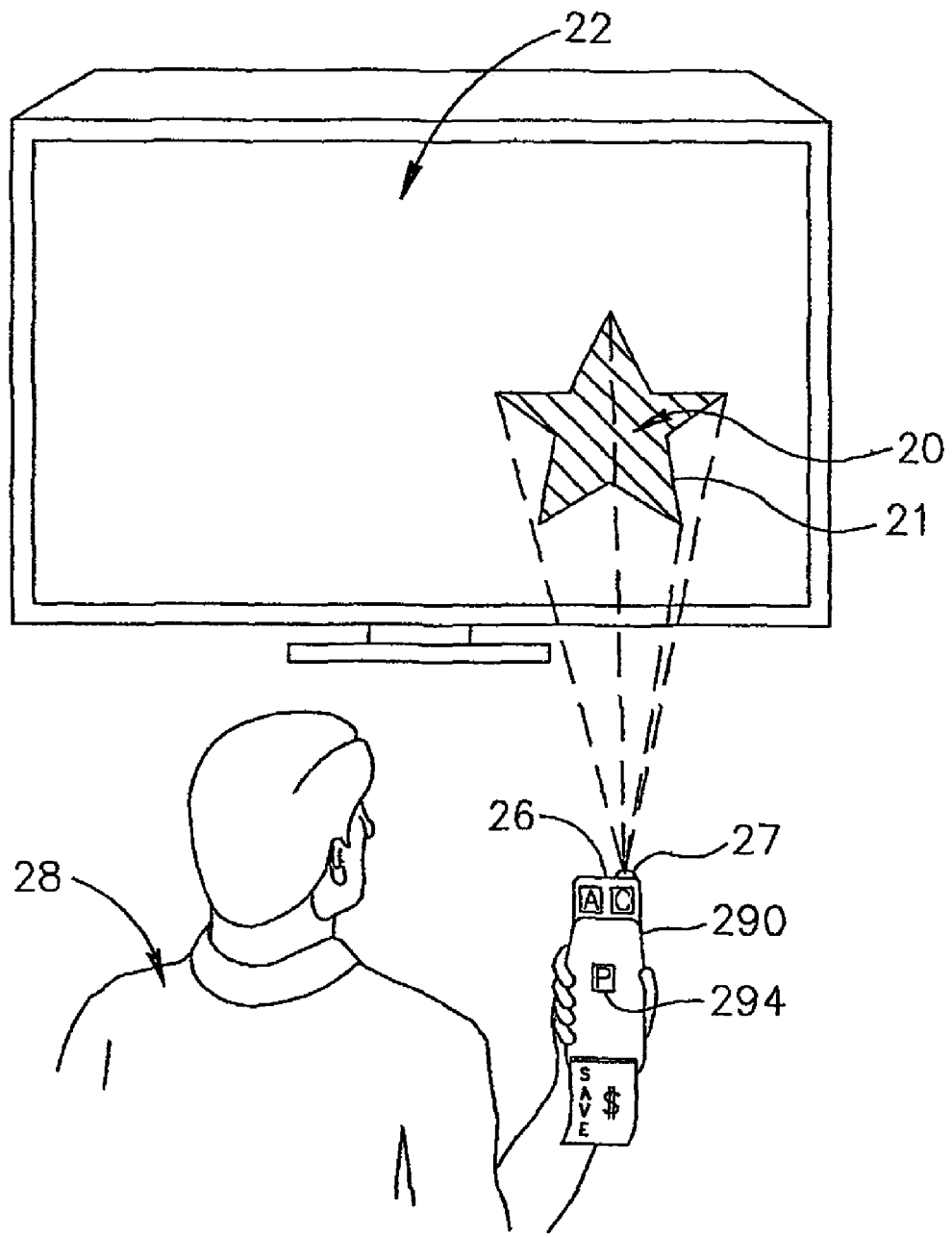
FIG. 13 is a diagram of a ninth embodiment of the present invention.

Alternately, as shown in FIG. 13, all of these above mentioned readers, reader 26 shown for example, could be employed with portable printers 290, such as hand-held or calculator type printers or the like, in replacement of the mobile communication device 24. These printers 290 can be integral with or removable from the reader 26. These printers 290 contain the requisite processing circuitry (hardware and software) for converting and optionally storing the information received from the reader 26 into a printable coupon 292. The coupon 292 is typically printed upon a button 294 or the like being activated.

In operation, similar to that shown and described for FIGS. 1A and 1B above, a coupon digital image 20 is broadcast over video signal and viewed as part 21 of a television picture 22. The reader 26 captures the coupon information transmission (as detailed above) and the captured data is converted to a format readable by the printer 290. The printer 290, upon the user pressing a button 294 or the like, the prints the coupon 292, on paper or the like. Redemption of this printed coupon would be in a manner similar to that for paper coupons.

In another embodiment, the reader 26 is not necessary, as only the mobile communication device 24, preferably a cellular telephone, is needed. In this embodiment, information is broadcast. Here, for example, a commercial, advertisement or the like may be broadcast over television, the Internet, radio, a billboard with a display screen or any other broadcast media, including those detailed above.

During the commercial, advertisement or the like, the information, or details of how to obtain the information, such as a coupon or details of how to obtain the coupon, will be broadcasted. The viewer or user can respond, should they desire information such as the coupon, from the broadcast, by making a transmission to a receiving point, here the call center 102 (FIG. 4 above), that distributes the specific information, such as the coupon, corresponding to its broadcast. This transmission at least includes one or more of his addresses, where he would like to receive the information (here, the coupon). The time period where valid transmissions from users will be accepted, so as to provide them with the desired information is synchronized at the receiving point with the broadcasting of the information. The addresses typically include a telephone (cellular) number, e-mail address, postal address or the like. Users, who made transmissions including one of their receiving addresses, to the receiving point, within the time period, are subsequently provided the information (here, the coupon) at the address or addresses, that they transmitted to the receiving point.

This procedure is typically performed by a user calling either a regular telephone number, in a standard manner, or with a special code, for example *abc. In the case of a regular number for the call, the user 28 may be required to enter a special code or password, so as to get the coupon of the subject broadcast. The time period for availability of the coupon is such that broadcasting time for the information (i.e., the coupon) is synchronized with the cellular network and the access time for the coupon at the call center 102. The information (i.e., the coupon) is then transmitted, sent, etc., to the user(s), typically from the call center or other communication distribution point, typically over wireless or wired networks, etc.

Alternately, the information can be in multiple portions of information, such as in the case of multiple coupons in the same advertisement, commercial or the like, each portion of information, such as each product for which there is a coupon being offered, can be linked to (associated with) its own identifier, typically its own telephone number. Alternately, the identifier, i.e., the telephone number broadcast, can be a special telephone number just for the specific coupon of that specific commercial, advertisement, etc. This is particularly useful when contemporaneous commercials, advertisements or the like, broadcast on different television channels, require users (viewers) to contact the call center 102.

The user then transmits an address or addresses, and data corresponding to one or more identifiers for the desired information portion (here, for the particular coupon desired), to the receiving point, within the synchronized time period (detailed above). Here, for example, the user calling the telephone number associated with the specific information portion, such as any of the multiple coupon offerings, at the call center 102, will receive the specific information, such as the requested coupon, from the call center 102. Typically, the coupon is received as part of a cellular transmission, along a cellular network.

The cellular telephone may indicate successful receipt of the cellular transmission and/or storage thereof, by sound, visual or tactile indications. The user's providing an address can also be from Caller Identification (ID) and decoding of "empty" calls (calls where a brief or momentary connection is made before the call is terminated) at the call center 102.

Still alternately, in the case of multiple coupons in the same commercial, advertisement, etc., or contemporaneous commercials, advertisements, etc., run on different television channels, the users (viewers) can contact the call center 102 (as detailed by any of the processes above). Once contact is made, the users will then be prompted to indicate the coupon they desire to be sent to them, by voice, depressing a button or buttons on the mobile communication device, or the like.

In another alternate embodiment, the call center 102 provides information, typically coupons to users who have sent the call center an electronic message, such as an e-mail, within the synchronization period. The e-mail address can be unique and therefore, serve as the identifier, for each information portion or multiple coupon, and also for information or coupons in contemporaneous transmissions over different channels. The electronic message typically includes identification information as to the user as well as addresses, to where communications should be sent. These addresses typically include in cellular telephone numbers, to where the call center will send the information, here, the coupon as a short message system (SMS) message to the user's cellular telephone. Addresses also include e-mail addresses, where the call center 102 can send the information (coupon) to the user's mobile communication devices, such as Internet enabled telephone, PDA, or to the user's personal computer.

This synchronization can be based on timestamps for transmissions into the call center from the users. For example, a coupon may be available only ten minutes after the commercial was broadcast. However, response to the broadcast may have been so great, that not all coupons could be distributed over the cellular network in this ten minutes. Accordingly, distribution may take more than this ten minutes or simply outside this ten minute period. However, users desiring the coupon would have the mobile communication devices preprogrammed to send short message system (SMS) messages with timestamps, such that all users who transmitted their SMS message with a timestamp to the call center, within this ten minute period, will receive the coupon over the cellular network.

In another alternate, the call center 102 will only provide information, for example coupons, for "members", such as users whose purchase and/or personal information is with the call center, subscribers to a cellular network, or the like. Here, the information, such as a coupon or the like, has been broadcast by any of the broadcasts detailed above, to the "member". The member then transmits to the call center, typically by a cellular telephone call, including an "empty" call, within the synchronized time period. The call center can identify the member by his telephone number, caller ID, decoding of empty calls, or may require further verification of member identification by a password, code, PIN number entry or the like. Once the member identification has been made, the requisite information, such as the coupon, is transmitted, sent or the like, to the member user in accordance with the processes detailed above.

With the coupon or other information having been captured, redemption is in accordance with any of the processes detailed above. However, since the reader 26 may not be present, a call to the call center 102 will have to be made should the user wish to make a purchase with this coupon in accordance with the process described and shown in FIG. 7.

The methods and apparatus disclosed herein have been described with exemplary reference to specific hardware and/or software. The methods have been described as exemplary, whereby specific steps and their order can be omitted and/or changed by persons of ordinary skill in the art to reduce embodiments of the present invention to practice without undue experimentation. The methods and apparatus have been described in a manner sufficient to enable persons of ordinary skill in the art to readily adapt other commercially available hardware and software as may be needed to reduce any of the embodiments of the present invention to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for information distribution comprising:
remotely providing visual user perceptible information to an end user electronic screen;
optically capturing said visual user perceptible information from said end user electronic screen with a video camera;
transforming said captured visual user perceptible information into a format recognizable by a mobile communication device to produce transformed information, and
storing said transformed information on said mobile communication device, further comprising providing an integral printer device for printing said transformed information.

2. The method of claim 1, wherein said integral printing device comprises a hand-held printer.

3. The method of claim 1, further comprising using said integral printer device for printing said transformed information.

4. A method for information distribution comprising:
placing digital information encoded into a printable visual pattern within a noticeable indicator;
prompting a user, via said noticeable indicator to capture said digital information from said printable visual pattern by optically scanning said printable visual pattern,
transforming said digital information into a format recognizable by a mobile communication device to produce transformed information, and storing said transformed information on said mobile communication device for display, further comprising providing an integral printer device for printing said transformed information.

5. The method of claim 4, wherein said integral printing device comprises a hand-held printer.

6. The method of claim 4, further comprising using said integral printer device for printing said transformed information.

7. A method for information distribution comprising:
electronically inserting digital information encoded as a noticeable indicator into a broadcast signal containing a related content;

prompting a user, via said noticeable indicator, to optically capture said digital information from said noticeable indicator within said broadcast signal;

transforming said captured digital information from said noticeable indicator into a format recognizable to a mobile communication device, thereby to produce transformed information; and storing said transformed information on said mobile communication device for display of the digital information, wherein each one of said mobile communication devices comprises an integral printing device.

8. The method of claim 7, said integral printing device comprises a hand-held printer.

9. The method of claim 7, further comprising using said integral printer device for printing said transformed information.

10. A portable capture and print device comprising:

a remote optical capture unit configured for optically capturing an indicator remotely from a screen formed from a broadcast image, a transforming unit associated with said remote optical capture unit, configured for transforming said indicator into a printable format and an integral printer associated with said transforming unit and configured for printing said indicator in printable format.

11. The device of claim 10, wherein the indicator comprises a noticeable indicator.

* * * * *